US006480525B1

(12) United States Patent
Parsa et al.

(10) Patent No.: US 6,480,525 B1
(45) Date of Patent: Nov. 12, 2002

(54) SECOND LEVEL COLLISION RESOLUTION FOR PACKET DATA COMMUNICATIONS

(75) Inventors: Kourosh Parsa, Riverside, CT (US); Emmanuel Kanterakis, North Brunswick, NJ (US)

(73) Assignee: Golden Bridge Technology Inc., West Long Branch, NJ (US)

( * ) Notice: Subject to any disclaimer, the term of this patent is extended or adjusted under 35 U.S.C. 154(b) by 19 days.

(21) Appl. No.: 09/722,688

(22) Filed: Nov. 28, 2000

Related U.S. Application Data

(60) Provisional application No. 60/167,852, filed on Nov. 29, 1999.

(51) Int. Cl.$^7$ .............................. H04K 1/00; H04B 7/216
(52) U.S. Cl. ......................... 375/141; 370/342; 370/441
(58) Field of Search ................................ 375/130, 140, 375/141, 146, 147; 370/320, 335, 342, 441, 445, 447

(56) References Cited

U.S. PATENT DOCUMENTS

| | | |
|---|---|---|
| 5,103,459 A | 4/1992 | Gilhousen et al. |
| 5,280,472 A | 1/1994 | Gilhousen et al. |
| 5,295,140 A | 3/1994 | Crisler et al. |
| 5,384,777 A | 1/1995 | Ahmadi et al. |
| 5,461,639 A | 10/1995 | Wheatley, III et al. |
| 5,537,397 A | 7/1996 | Abramson |
| 5,544,196 A | 8/1996 | Tiedemann, Jr. et al. |
| 5,671,218 A | 9/1997 | I et al. |
| 5,673,259 A | 9/1997 | Quick, Jr. |
| 5,729,542 A | 3/1998 | Dupont |
| 5,802,465 A | 9/1998 | Hamalainen et al. |
| 5,825,835 A | 10/1998 | Kingston et al. |
| 5,850,602 A | 12/1998 | Tisdale et al. |
| 5,875,182 A | 2/1999 | Hatzipapafotiou |

(List continued on next page.)

FOREIGN PATENT DOCUMENTS

| | | |
|---|---|---|
| WO | 003499 A1 | 1/2000 |
| WO | 008908 A2 | 2/2000 |
| WO | 018172 A1 | 3/2000 |
| WO | 022873 A1 | 4/2000 |
| WO | 057591 A1 | 9/2000 |
| WO | 057663 A1 | 9/2000 |

OTHER PUBLICATIONS

"Start UMTS Services with 3G–GPRS:CPCH FACH," *Golden Bridge Technology*, Innovations and Technologies, pp. 1–20 (Jun. 27, 2000).

The Common Packet Channel considered the 3$^{rd}$ Generation GPRS, *System Engineering of Data Services in UMTS W–CDMA Systems*, Galway, Ireland, Oct. 1–4, 2000.

"Smart UMTS Services with 3G–GPRS:CPCH/FACH", *Golden Bridge Technology*, pp. 1–20.

"The Common Packet Channel Considered the 3rd Generation GPRS", by K. Parsa et al., Oct. 2000, pp.

*Primary Examiner*—Tesfalbet Bocure
(74) *Attorney, Agent, or Firm*—McDermott, Will & Emery

(57) ABSTRACT

In a code-division-multiple-access (CDMA) system employing spread-spectrum modulation, mobile stations initially seek access to a selected one of two or more groups of common packet channels (CPCHs) serviced through a base station. A second order collision resolution phase, conducted between the base stations and contending mobile stations, serves to allocate one or more available channels from the selected group of channels among the contending mobile stations. In the collision resolution phase, each mobile station randomly selects a collision detection (CD) signature and sends that signature in a CD preamble. For each available channel in the group, the base station assigns one of the mobile stations. For each assigned mobile station, the base station transmits a CD acknowledgement that corresponds to the CD preamble of the assigned mobile station and identifies the available channel assigned to that mobile station.

28 Claims, 10 Drawing Sheets

U.S. PATENT DOCUMENTS

| | | |
|---|---|---|
| 5,893,036 A | 4/1999 | Trandai et al. |
| 5,894,472 A | 4/1999 | de Seze |
| 5,933,777 A | 8/1999 | Rahman |
| 5,943,327 A | 8/1999 | Mademann |
| 5,953,369 A | 9/1999 | Suzuki |
| 5,982,763 A | 11/1999 | Sato |
| 5,991,308 A | 11/1999 | Fuhrmann et al. |
| 6,009,089 A | 12/1999 | Huang et al. |
| 6,011,788 A | 1/2000 | Hurst et al. |
| 6,026,081 A | 2/2000 | Hamabe |
| 6,031,832 A | 2/2000 | Turina |
| 6,038,223 A | 3/2000 | Hansson et al. |
| 6,038,250 A | 3/2000 | Shou et al. |
| 6,115,390 A | 9/2000 | Chuah |
| 6,163,533 A | 12/2000 | Esmailzadeh et al. |
| 6,163,708 A | 12/2000 | Groe |
| 6,169,759 B1 | 1/2001 | Kanterakis et al. |

SECOND LEVEL COLLISION RESOLUTION FOR PACKET DATA COMMUNICATIONS

RELATED APPLICATION

This application claims the benefit of U.S. Provisional Application No. 60/167,852, entitled "CLOSED LOOP POWER CONTROL OF THE FORWARD ACCESS CHANNEL (FACH), DOWNLINK COMMON PACKET CHANNEL VIA UPLINK CPCH" filed on Nov. 29, 1999, the disclosure of which is entirely incorporated herein by reference.

FIELD OF THE INVENTION

This invention relates to spread-spectrum communications, and more particularly to code-division-multiple-access (CDMA) cellular, packet-switched communication systems. The inventive concepts involve optimization of packet data communications using a hybrid DSMA-CR/CDMA multiple access method with a second level collision resolution.

BACKGROUND

Recent developments in wireless communications technologies have allowed expansion of service offerings from the original voice telephone service model to include a number of services supporting packet data communications. As customers become increasingly familiar with data services offered through landline networks, they are increasingly demanding comparable data communications in the wireless domain, for example to maintain service while mobile subscribers roam freely or to provide remote service in locations where wireless loops are preferable to landline subscriber loops. A number of technologies support packet data communications in the wireless domain.

For example, a random access channel (RACH) provides packet uplink transport from a mobile station (MS) to a base station (BS), with a random slotted-ALOHA type access procedure. A common-packet channel (CPCH) provides a similar uplink transport for transmitting variable size packets from a mobile station (MS) to a base station (BS). The RACH and CPCH channels do not need direct resource allocation. The channel resource-allocation of these channels is contention based. The mobile station transmits an access preamble corresponding to a channel that the mobile station desires to use. The base station responds with a matching preamble that signals successful access to the selected channel resource.

The CPCH also utilizes a first level collision detection phase, to allocate the channel to a mobile station that successfully avoids collision. If two or more mobile stations are still attempting access to the same channel at the time of the collision detection phase, the base station will respond with at most one matching collision detection preamble, effectively allocating the channel to the one mobile station. In some cases, the base station will not be able to resolve the collision detection and will not send back any collision detection preamble. A mobile station that fails to receive its matching collision detection preamble from the base station aborts its access attempt.

A Digital Sense Multiple Access (DSMA) implementation of a common-packet channel (CPCH) provides additional mechanisms, such as the status broadcast and the piggybacking to the basic CPCH. In a Digital Sense Multiple Access (DSMA) system, whenever a base station detects the presence of a subscriber unit transmission on the reverse channel it asserts a periodically occurring flag, called a "busy/idle" flag, on the associated forward channel. This flag is asserted logically true whenever the channel is busy. Any subscriber unit that already is transmitting when the busy/idle flag is set true may continue to transmit. However, all other subscriber units desiring access to a channel must wait. Essentially, each of the mobile stations will interpret a busy state as an instruction to "backoff" and delay its next access attempt or wait until the busy/idle flag is reset or cleared indicating that at least one channel is idle and available. Since the two-way propagation delay is much less than the minimum packet length, the DSMA type protocols perform much better than traditional slotted ALOHA type protocols. The physical layer and the underlying spread spectrum system allow the quick detection of a collision. This approach only allows the base station to generally throttle back the traffic flow.

These wireless packet data communications do not adequately address collision resolution, instead of detection, to various undetected contending mobile stations. Also, there are gaps in channel utilization due to non-arrival probability. For example, more than one mobile stations may be attempting to access channel 1 at time t while no mobile station is attempting to access another one of the channels on the CDMA system, leaving the other channel vacant. At a later time t+1, there may be no mobile station at all attempting to access the same channel contended for at time t, leaving that first channel vacant.

It has been found that there is roughly a 30% chance that two or more preambles from mobile stations will arrive at the base station in any given 50 ms time-window. There also is a 32% chance that no mobile station requests access to a particular channel during the same 50 ms time-window. These collisions and gaps in channel utilization effectively limit system throughput and block further improvement in system throughput.

SUMMARY OF THE INVENTION

This invention introduces a second-level collision resolution method and apparatus, which addresses the above issue, thus improving the attainable throughput gain. The second-level collision resolution method provides an approach to resolve collision and concurrently allow the base station to assign a channel resource out of a predefined group of channel resources to one or more contending mobile stations. The method also allows priority schemes.

Hence a general objective of the invention is to allow mobile stations to request access to a group of packet channel resources. The request selection can be based on availability of the channels within the group of packet channel resources.

Another objective relates to improving data throughput by having the base station assign channel resources from the requested group to various mobile stations, and thus facilitate a more even distribution of usage over available channels.

The present invention provides an improvement to a code-division-multiple-access (CDMA) system employing spread-spectrum modulation. Mobile stations initially seek access to a selected one of a plurality of groups of channels serviced through a base station. A principal feature of the invention relates to a second order collision resolution phase, which also serves to allocate one or more available channels from the group among contending mobile stations.

In a preferred embodiment, the CDMA system has a radio network controller (RNC) and a plurality of base stations, which serve a plurality of mobile or remote stations. Each base station (BS) has a BS-spread-spectrum transmitter and a BS-spread-spectrum receiver. Each mobile station (MS) has an MS-spread-spectrum transmitter and an MS-spread-spectrum receiver. In the preferred embodiment, the RNC monitors traffic demand, based on traffic measurement information of communications through the base stations for the mobile stations. Based on the traffic demand or a projection thereof, the RNC assigns channel resources to the base stations, by re-configuring the channel resources within each cell.

A base station broadcasts, on a periodic or non-periodic basis, availability related status information for two or more groups formed from the channels allocated to the base station. For example, the status information can contain actual availability information, i.e. idle or busy of one or more channels in each group, or available data rate information for each group, or both. At a mobile station, the steps include monitoring the broadcast(s) of the status information. Based on the broadcast status information, the MS selects a group of m channels containing at least one idle channel. The channel group selection by the MS can utilize a dynamic persistence algorithm or any other algorithm commonly known in the art.

Following channel group selection, the MS starts transmission of a series of access preambles (AP). Each AP contains a signature selected from a set of predefined signatures used for communications with the particular base station (BS). The selected AP signature corresponds to a predefined group of m channels. The MS transmits the access preambles at well-selected time intervals and at increasing power levels. The MS stops its transmission of the access preambles when the access preamble has been picked up and detected by the BS, the BS has responded with an acknowledgment AP-AICH, and the MS has also successfully received the AP-AICH. Alternatively, the MS ceases its access preamble transmissions if the MS has transmitted the maximum allowed number of access preambles $M_{AP}$.

In the inventive system, the AP-AICH corresponds to the preamble used for requesting access to one group of channels. At this point, the base station has indicated that there is at least one channel in the group actually available, but a specific one of the channels has not yet been assigned to or seized by any one mobile station. In some cases, two or more mobile stations are seeking access to channels in the same group. Sometimes there will be enough available channels to service all of the mobile stations requesting access, and sometimes there may still not be enough available channel resources. In accord with the invention, specific channel assignment to one or more individual mobile stations occurs as part of the collision resolution phase, so that this phase performs a second order collision resolution function as well as a resource allocation function.

Upon receiving this AP-AICH signal, each mobile station seeking access to the group of channels randomly selects one collision detection (C/D) signature from a predefined signature set and transmits a CD preamble containing that signature. Since each mobile station randomly selects one of the possible collision detection (CD) signatures, typically, no two stations seeking access to the same group will pick the exact same CD signature.

When the base station receives one or a plurality of CD preambles from a plurality of mobile stations, it identifies all of the different CD preambles from the received signals. The base station then selects only n mobile stations. Here, n is the number of available channels in that channel group. The base station transmits a CD acknowledgement (CD-AICH) signal to each of the n mobile stations. Each CD-AICH corresponds to the CD preamble signature selected from the received signals and refers to one assigned channel from the group of m channels. Assuming successful resolution of any overlaps, and selection of the n CD preambles, the base station has effectively assigned the n available channels to the n mobile stations by sending back the appropriate CD-AICH signals.

Upon receiving a CD acknowledgement CD-AICH, which corresponds to the sent CD signature, the mobile station begins to send its packet data along with any closed-loop power control information. For this transmission, the mobile station uses the channelization codes for the one channel of the group referred to by the particular CD-AICH signal received from the base station. The base station also sends its downlink closed-loop power control information simultaneously. A pre-data power control phase is optional.

If the mobile station detects a loss of the downlink channel, for example, during transmission of the power control preamble or the packet data, the mobile station halts its uplink transmission. Essentially, the mobile station aborts the access attempt and sends a failure message to the MAC layer of the associated data equipment. The base station can utilize this feature, by cutting off the downlink transmission, to instruct mobile stations not to use a channel following an unresolved collision.

During a transmission of data, the mobile station that has successfully obtained access can piggy-back packets, one after another, so long as it has packets ready to send, up to a maximum limit set by the network. Essentially, this allows the mobile station to hold the channel if the MAC equipment supplies further packets to the PHY elements in the midst of an uplink transmission.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

DETAILED DESCRIPTION OF THE PRESENTLY PREFERRED EMBODIMENTS

Figure 1:
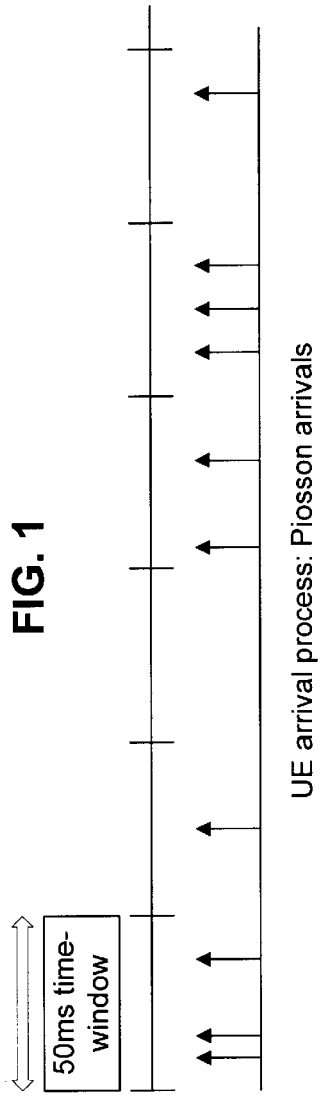
FIG. 1 is a timing diagram showing predicted random access attempts as arrivals at a base station, for mobile stations seeking access to CPCH channels.

Reference now is made in detail to the presently preferred embodiments of the invention, examples of which are illustrated in the accompanying drawings, wherein like reference numerals indicate like elements throughout the several views.

Figure 2:
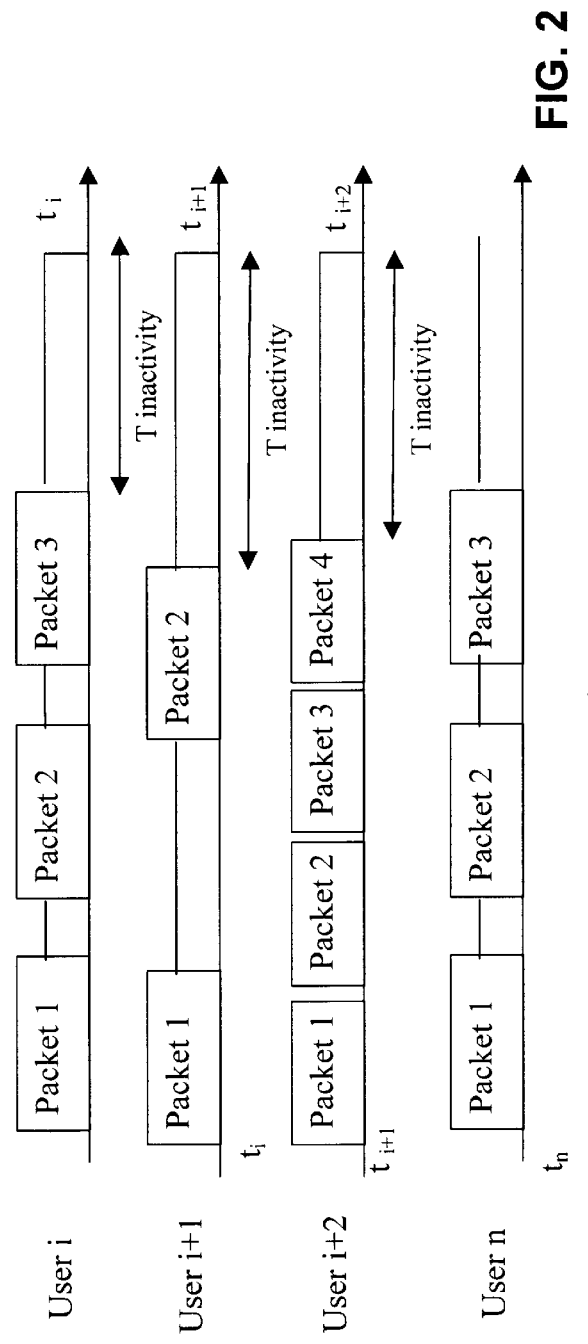
FIG. 2 is a diagram of the packet timing of a number of user transmissions.

FIG. 1 shows a random distribution of CD preambles arriving at the base station over time, assuming a Poisson arrival distribution. FIG. 2 represents the general environment of the packet generation and thus the demand for channel access in a multi-channel CDMA packet data network. The simplified illustration represents users i to n (four shown), wherein the associated data equipment generates packets for transmission at relatively random times. The MAC or media access control layer devices supply these packets to the PHY or physical layer elements for transmission over the CDMA network.

The present invention involves a second-level collision resolution methodology, for assigning one or more of a number of communication channels in a spread spectrum wireless communication network in such a manner as to optimize resource allocation and minimize gaps in channel utilization that would otherwise occur with random access. The inventive collision resolution methodology accommodates the reality of non-arrival probability in radio access (FIG. 1). The second-level collision resolution provides an approach to improve data throughput by having the mobile station select one group of m channels and the base station assign the mobile station to an idle channel of the group.

Figure 3:
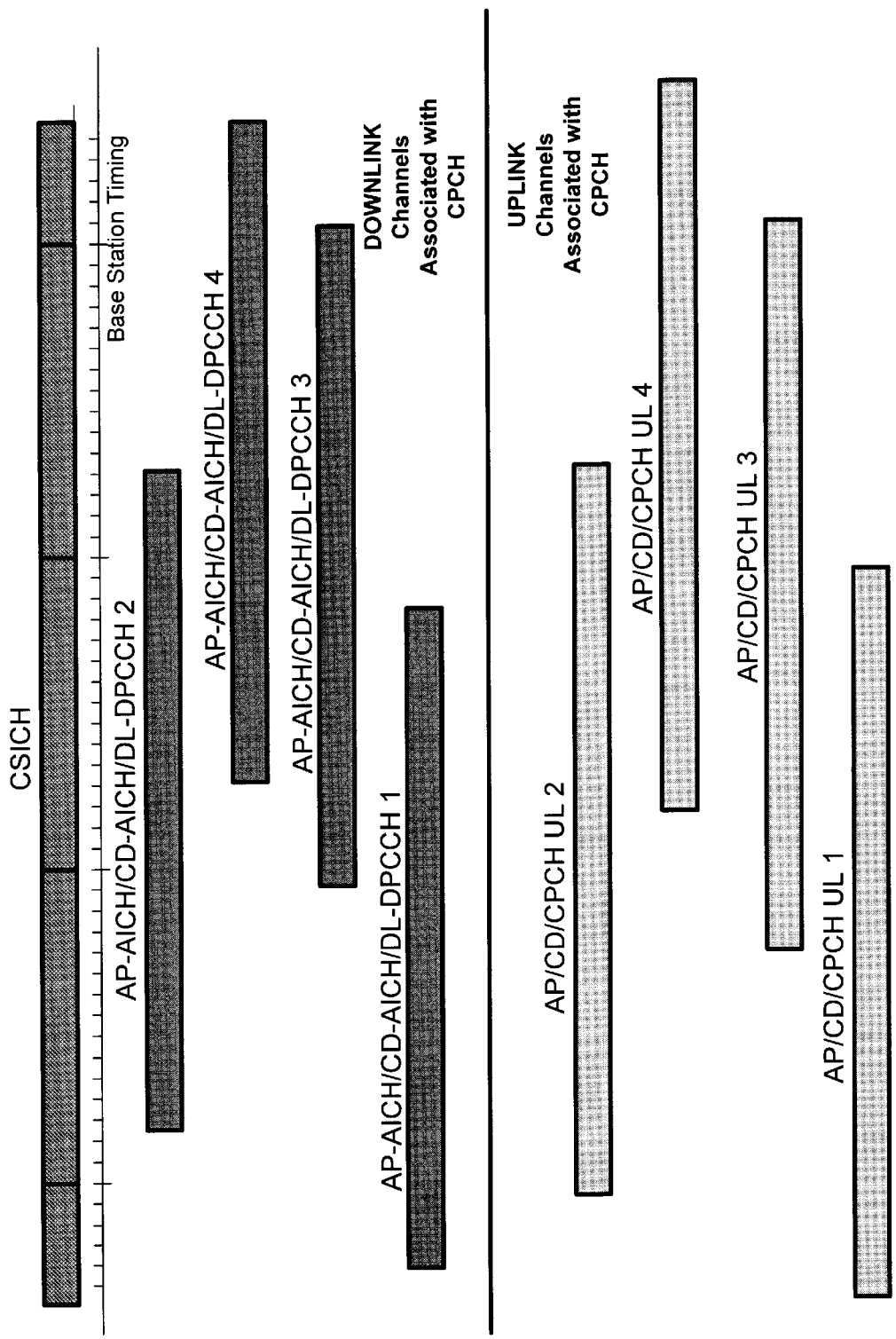
FIG. 3 is an illustration of the relationship of a number of CPCH channels to a CSICH channel for distribution of channel group status information in accord with the invention.

As shown in the simplified example of FIG. 3, a base station (BS) provides a plurality of channel pairs. The PHY or physical layer elements must communicate with the base station to select and obtain access to an available uplink (UL) channel for transmission of the packets. Where there are sufficient channel resources for all active users, all user devices may transmit over the channels, essentially in parallel. However, during these transmissions, often other User Equipment (UE) devices are awaiting access to a channel.

In a preferred embodiment (FIG. 4), the CDMA system comprises a radio network controller (RNC) 11, a plurality of base stations 13 and a plurality of mobile stations 15. Each base station (BS) 13 has BS-spread-spectrum transmitter and a BS-spread-spectrum receiver, shown as a single transceiver (XSCV'R) system 17 for simplicity in this drawing. Each of the mobile stations (MS) 15 has an MS-spread-spectrum transmitter and an MS-spread-spectrum receiver (not separately shown). Exemplary transmitters and receivers for use in the BS and MS network elements are discussed in more detail below with regard to FIGS. 5 and 6, as will be discussed more, later.

In a typical embodiment, the radio network controller (RNC) 11 provides two-way packet data communications to a wide area network, shown by way of example as a packet-switched network 19. The RNC 11 and the network 19 provide the MS units 15 with two-way packet data communications services to enable communication to and from devices, represented by way of example by the IP telephone 21, the personal computer (PC) 23 and the server 25. Each common-packet channel CPCH through the system is an uplink transport channel for transmitting variable size packets from a mobile station (MS) 15 to a base station (BS) 13.

Upon power-up, an MS 15 searches for a transmission from any nearby BS 13. Upon successful synchronization with one or more BSs, the MS 15 receives the necessary system parameters from a continuously transmitted BS broadcast control channel (BCCH), which is broadcast by all base stations 13. Using the information transmitted from the BCCH, the MS 15 can determine various parameters required when first transmitting to a BS. Parameters of interest are the loading of all the base stations in the vicinity of the MS, their antenna characteristics, spreading codes used to spread the downlink transmitted information, timing information and other control information. With this information, the MS 15 can transmit specific waveforms in order to capture the attention of a nearby BS 13.

The spread-spectrum transmitter in the BS transceiver 17 broadcasts channel-group status information to the mobile stations 15 on a periodic or non-periodic basis. This transmission utilizes one of the common downlink channels, which is referred to here as a CPCH status indicator channel (CSICH). This broadcast status information can relate the availability (Idle) or non-availability (Busy) of every single common packet channel. However, the status information preferably relates to the availability or non-availability of groups of the common packet channels. The broadcast status information may also indicate the available data rates for each common packet channel or for groups of common packet channels.

Figure 7:
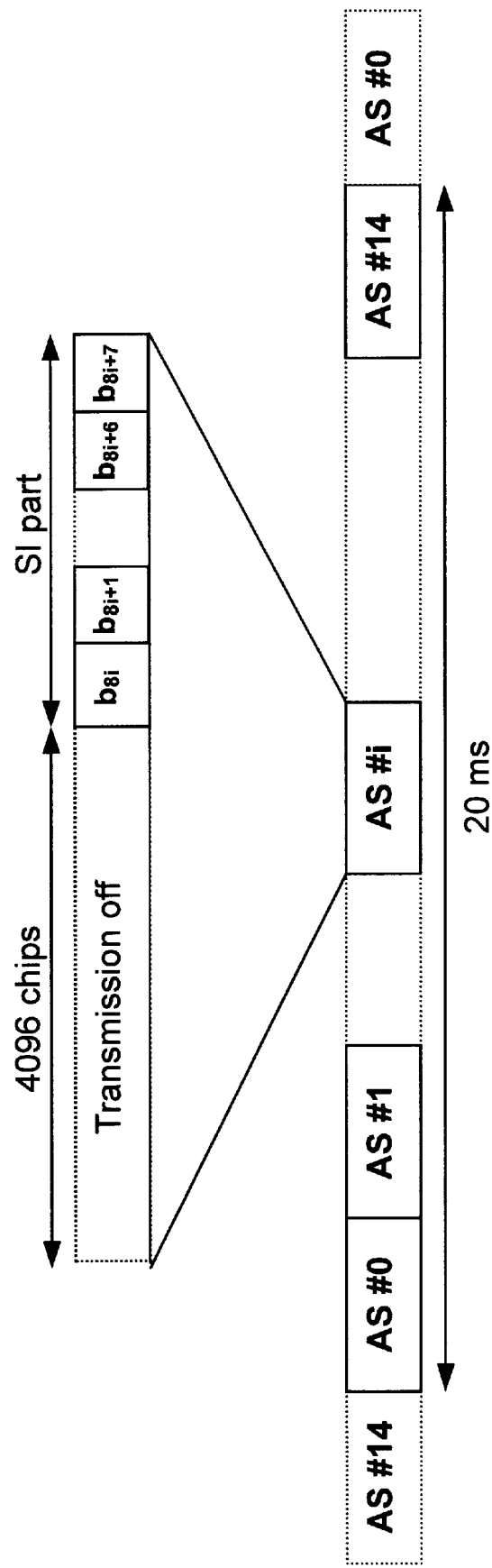
FIG. 7 is an illustration of the frame structure of a CPCH status indicator channel (CSICH) used to provide information as to the availability of groups of CPCH channels in accord with the present invention.

The CPCH Status Indicator Channel (CSICH) is a fixed rate (SF=256) physical channel used to carry CPCH status information. In the preferred embodiment of FIG. 7, the CSICH is associated with a physical channel used for transmission of CPCH AP-AICH and uses the same channelization and scrambling codes. The illustrated CSICH frame consists of 15 consecutive access slots (AS) each of length 40 bits. Each access slot consists of two parts, a part of duration 4096 chips with no transmission that is not formally part of the CSICH, and a Status Indicator (SI) part consisting of 8 bits $b_{8I}, \ldots b_{8I+7}$, where I is the access slot number. The part of the access slot with no transmission is reserved for use by AICH, AP-AICH or CD/CA-ICH. The modulation used by the CSICH is the same as for the PICH. The phase reference for the CSICH is the Primary CPICH.

The Status Indicators are in all the access slots of the CSICH frame, even if some signatures and/or access slots are shared between CPCH and random access channel (RACH) services. Each CSICH frame carriers N Status Indicators. The mapping from $\{SI_0, \ldots, SI_{N-1}\}$ to the CSICH bits $\{b_0, \ldots, b_{119}\}$ follows the rules set forth in table 1.

TABLE 1

Mapping of Status Indicators (SI) to CSICH bits

| Number of SI per frame (N) | $SI_n = 1$ | $SI_n = 0$ |
|---|---|---|
| N = 1 | $\{b_0, \ldots, b_{119}\} = \{-1,-1,\ldots,-1\}$ | $\{b_0, \ldots, b_{119}\} = \{+1,+1,\ldots,+1\}$ |
| N = 3 | $\{b_{40n}, \ldots, b_{40n+39}\} = \{-1,-1,\ldots,-1\}$ | $\{b_{40n}, \ldots, b_{40n+39}\} = \{+1,+1,\ldots,+1\}$ |
| N = 5 | $\{b_{24n}, \ldots, b_{24n+23}\} = \{-1,-1,\ldots,-1\}$ | $\{b_{24n}, \ldots, b_{24n+23}\} = \{+1,+1,\ldots,+1\}$ |
| N = 15 | $\{b_{8n}, \ldots, b_{8n+7}\} = \{-1,-1,\ldots,-1\}$ | $\{b_{8n}, \ldots, b_{8n+7}\} = \{+1,+1,\ldots,+1\}$ |
| N = 30 | $\{b_{4n}, \ldots, b_{4n+3}\} = \{-1,-1,-1,-1\}$ | $\{b_{4n}, \ldots, b_{4n+3}\} = \{+1,+1,+1,+1\}$ |
| N = 60 | $\{b_{2n}, b_{2n+1}\} = \{-1,-1\}$ | $\{b_{2n}, b_{2n+1}\} = \{+1,+1\}$ |

A variety of different availability-status bit mapping arrangements may be used. Higher layers set the values of the Status Indicators. At the user equipment (UE) the number of status indicators per frame is a higher layer parameter. The higher layers provide Layer 1 or PHY equipment with the mapping between the values of the Status Indicators and the actual availability of the CPCH channel groups.

Figure 4:
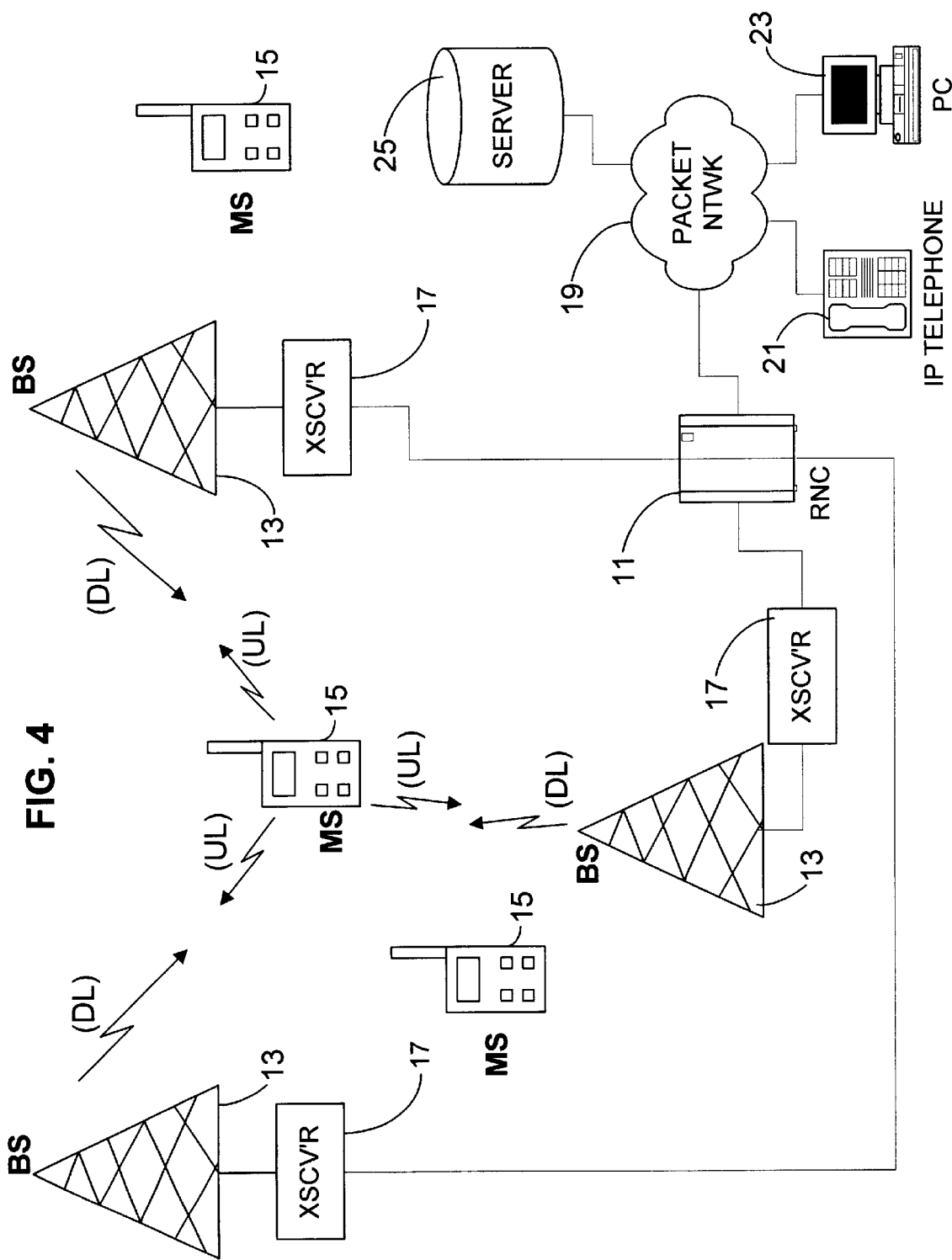
FIG. 4 is a functional block diagram of a CDMA network, capable of implementing the communications in accord with the present invention.

In operation of the network of FIG. 4, a mobile station (MS) 15 monitors the broadcast information on the CSICH channel. When the particular MS 15 has a first packet to transmit, it uses the latest broadcast information to select a group of CPCH channels containing at least one idle CPCH uplink (UL) channel. The selection of UL channel group by the MS can be based on a dynamic persistence algorithm or any other algorithm commonly known in the art. The MS 15 then enters the access phase, in which the mobile station (MS) 15 initiates a ramp up process in order to capture the attention of the nearby BS.

Figure 11:
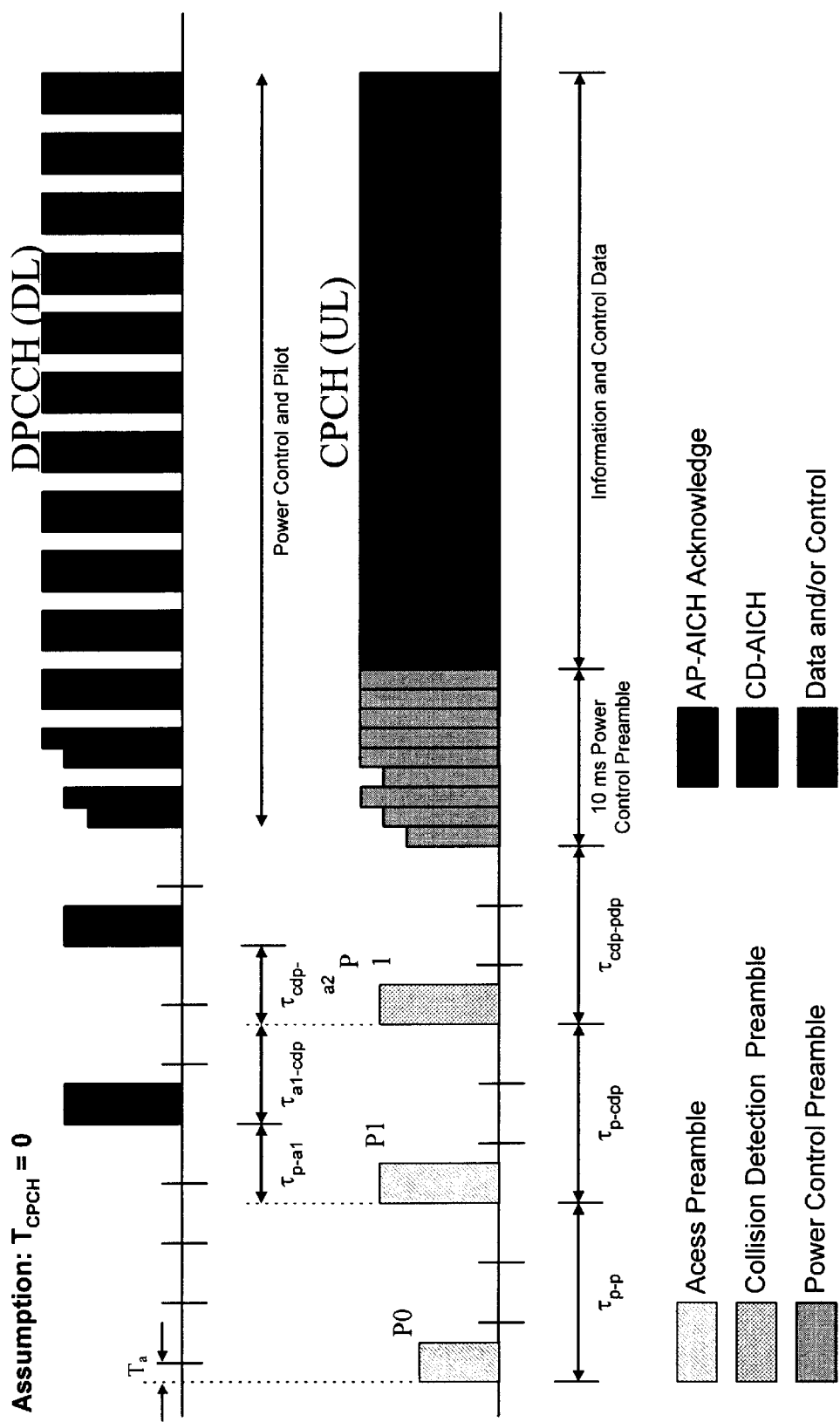
FIG. 11 is an illustration of the timing of PCPCH and AICH transmission as seen by the UE, with $T_{CPCH}=0$.

The access phase involves the MS-spread-spectrum transmitter sending one of more access preambles (AP), in access slots defined in relation to a frame-timing signal derived from receipt of the common synchronization channel. FIG. 11 illustrates examples of both the downlink (DL) and uplink (UL) transmissions and the PCPCH/AICH timing relationship when TCPCH is set to 0 and all access slot subchannels are available for the physical CPCH channel CPCH). The TCPCH timing parameter determines the default access slot spacing between successive preambles and the response time of the base station to these preambles.

The MS transmits the particular access preamble (AP) corresponding to the selected group of channels at predefined time intervals set according to synchronization information derived from downlink transmitted signals received over a broadcast channel. The MS transmits a set of access preambles of duration Tp whose power is increased in time from preamble transmission to preamble transmission, preferably in a step-wise manner.

Each access preamble contains an AP signature selected from a set of predefined signatures at a well-selected time interval in sequentially increasing power levels. The selected signature effectively identifies the selected group the m uplink channels. By way of example, table 2 shows that given m=2, AP signatures 1 to 6 correspond to sequentially numbered pairs of the CPCH channels 1 to 16. If the access preambles contain AP signature 1, in this example, the MS is requesting access to either CPCH channel 1 or CPCH channel (a channel in the first group) 2.

TABLE 2

AP Signatures Corresponding to Groups of m = 2 Channels

| AP | CD1 | CD2 |
|---|---|---|
| AP = 1 | CPCH1 | CPCH2 |
| AP = 2 | CPCH3 | CPCH4 |
| AP = 3 | CPCH5 | CPCH6 |
| AP = 4 | CPCH7 | CPCH8 |
| AP = 5 | CPCH9 | CPCH10 |
| AP = 6 | CPCH11 | CPCH12 |
| AP = 7 | CPCH13 | CPCH14 |
| AP = 8 | CPCH15 | CPCH16 |

The transmission of the access preambles ceases when one access preamble has been picked up and detected by the BS 13, and the BS 13 has responded with an acknowledgment AP-AICH, which the MS 15 has also successfully received. Alternatively, the MS 15 will cease its transmission of access preambles if the MS has transmitted the maximum allowed number of access preambles $M_{AP}$.

With this ALOHA type access technique, there is a good possibility that two or more MSs 15 may try to access the BS 13 using the same access preamble, for the same group of channels, at substantially the same time. Since the access preamble identifies a group of channels, in many cases, there are resources available to service a number of the requests from the mobile stations. The AP-AICH acknowledgement signal is sent back and may be successfully received by a number of MSs 15, which are contending for access via the BS 13, using the same access preamble signature. In this event, more than one MS will have succeeded through the first ramp-up phase at the same time.

Each successful MS 15 and the BS 13 will then enter a Collision Resolution phase, where the BS effectively assigns only the n idle CPCH channel(s) in the requested group of CPCH channels to only n of the contending mobile stations 15, where n is the number of currently available channels in the group. The collision resolution phase is also referred to as the channel assignment phase. In this collision resolution phase, upon receiving this AP-AICH, each successful MS randomly selects a collision detection (CD) signature and transmits a CD preamble containing that CD signature (shown as with cross-hatch shading at P1 on the UL channel in FIG. 11). The BS only responds to n of the mobile stations by sending out n CD acknowledgements (CD-AICH), corresponding to the CD signatures of the selected n mobile station(s). However, the CD-AICH signals are carefully chosen to effectuate a specific assignment of available channels from the group to the n mobile stations, on an individual basis.

For example, assume that two mobile stations, MS A and MS B, have requested channel access from within the same group of two channels (m=2), channel 1 and channel 2, both of which are currently available (n=2). The BS 13 will then send two CD-AICH signals to the MS A and the MS B. The first CD-AICH is called CD1-ICH, which corresponds to the CD signature of the MS A and instructs the MS A to proceed with use of channel 1. The second CD-AICH is called CD2-ICH, which corresponds to the CD signature of the MS B and instructs the MS B to proceed with use of channel 2.

Figure 8:
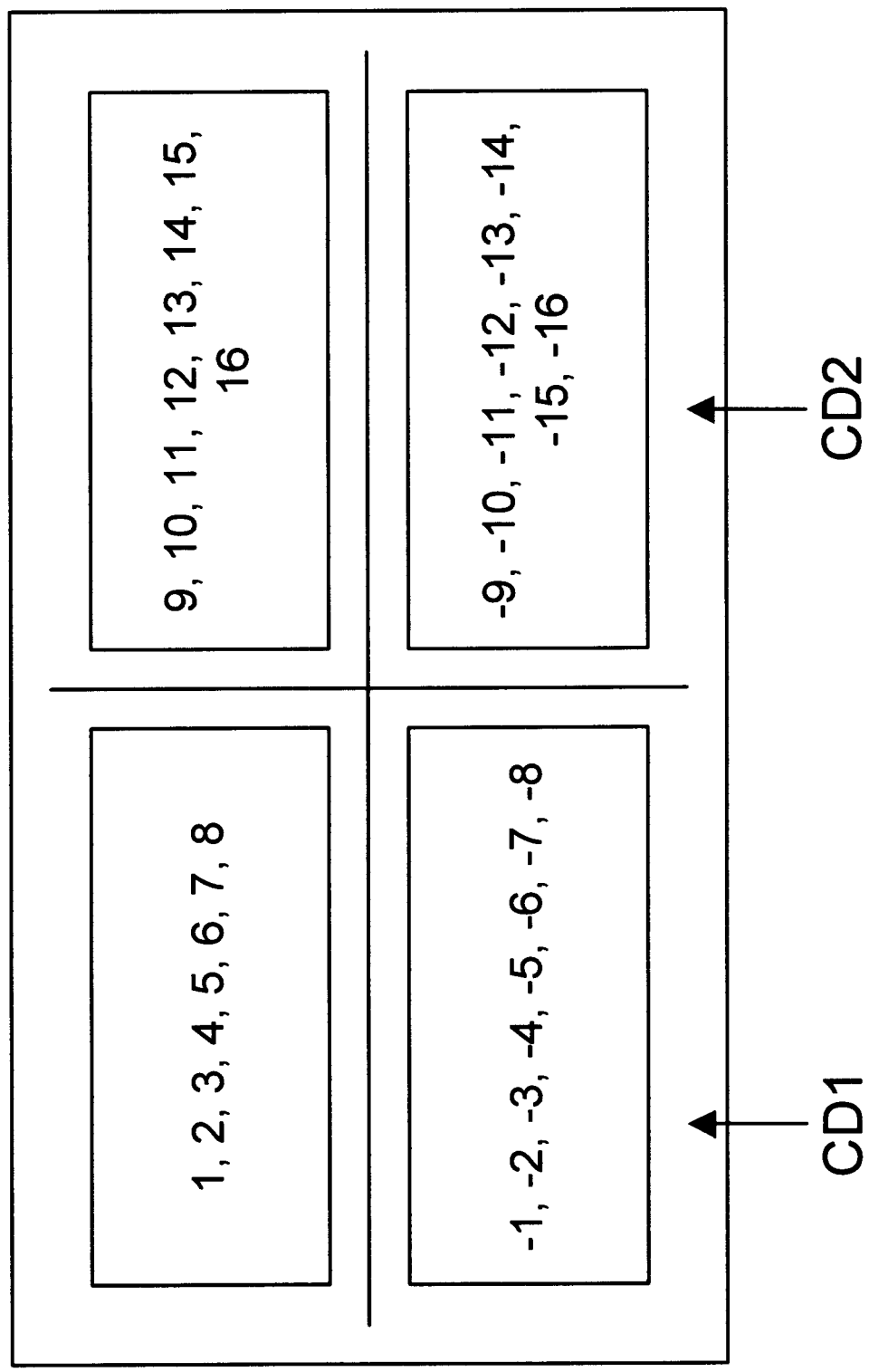
FIG. 8 shows an example of channel mapping to collision detection (CD) acknowledgements.

The mobile stations interpret the CD-AICH channel assignment information by using information similar to Table 3 for a system having two channels per group. The mapping table can be devised in various ways. FIG. 8 provides an example of channel mapping by dividing the 32 CD-AICH into two (m=2) groups: 1) CD1 associated with a set of CPCH channels and 2) CD2 associated with a different set of CPCH channels. There are 16 positive and negative signatures for CD-AICH. The first eight positive and the first eight negative signatures constitute the CD1 set for the first channel group, and the second eight positive and the second eight negative signatures constitute the CD2 set for the other channel group.

TABLE 3

Sample Channel Assignment Information for Various CD Signature, m = 2

| CD Preamble Signature | CD1-ICH Responses Signatures | CD2-ICH Responses Signatures |
|---|---|---|
| 1 | 1 | 9 |
| 2 | 2 | 10 |
| 3 | 3 | 11 |
| 4 | 4 | 12 |
| 5 | 5 | 13 |
| 6 | 6 | 14 |
| 7 | 7 | 15 |
| 8 | 8 | 16 |
| 9 | −1 | −9 |
| 10 | −2 | −10 |
| 11 | −3 | −11 |
| 12 | −4 | −12 |
| 13 | −5 | −13 |
| 14 | −6 | −14 |
| 15 | −7 | −15 |
| 16 | −8 | −16 |

Figure 9:
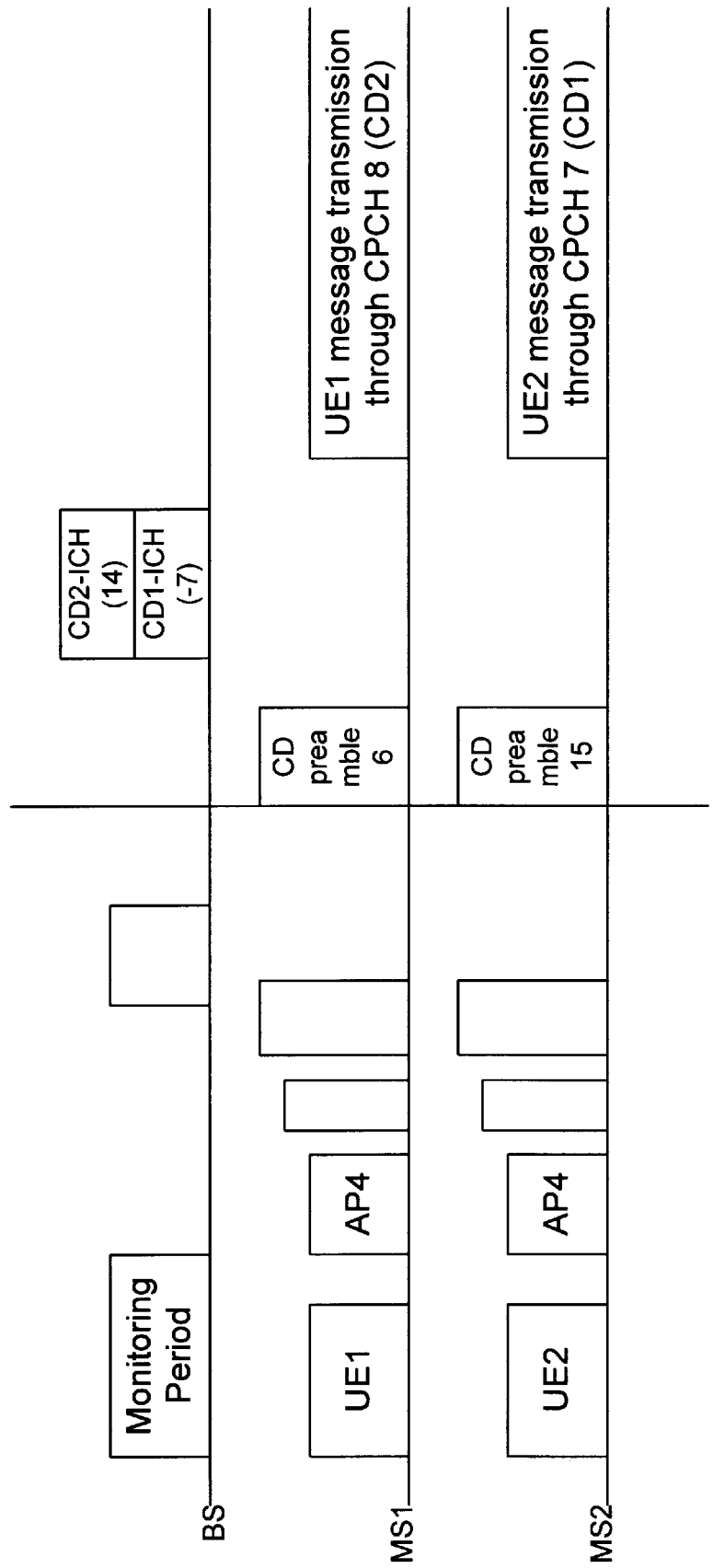
FIG. 9 is an illustration of the channel assignment.

FIG. 9 is a signal/timing diagram illustrating the access phase and the CD phase for channel assignment. The top line represents the activities of the base station, whereas the other lines represent the activities of two of the mobile stations. Initially, the base station is in a waiting state, monitoring for access preambles. The user equipment (UE) at each of the two stations supplies a packet to the PHY elements with a request to transmit over a CPCH channel.

Each mobile station goes through the access phase as described above (see also FIG. 11). In the example of FIG. 9, assume that the two mobile stations select and send the preamble with the signature 4 (AP4 in the drawing). As shown in table 2 above, this preamble serves as a request to access one of the channels in the fourth group (CPCH7 and CPCH8). The base station responds with the AP-AICH that is the appropriate acknowledgement for that group.

In the example of FIG. 9, the first mobile, station (middle line) selects CD preamble #6. At the same time, the other mobile station (bottom line) selects CD preamble #15. The base station receives both CD preambles. The base station assigns CPCH8 to the user equipment of the first mobile station (UE1) by sending back the CD2-ICH acknowledgement +14 (see table 3). The base station assigns the other channel in the group, CPCH7, to the user equipment of the second mobile station (UE1) by sending back the CD1-ICH acknowledgement −7 (see table 3). Upon receipt of the respective CD acknowledgements, the mobile stations can identify the assigned channels of the group from the CD acknowledgements, and the mobile stations proceed with message transmission over the respective CPCH channels.

Hence upon receiving this corresponding CD-AICH and determining which channel the MS was assigned, each selected MS enters the data transmission phase and begins to send its packet data along with any closed-loop power control information. The BS also sends its downlink closed-loop power control information simultaneously. During the data transmission phase, if the PHY elements of the MS receive more packets in the interim, they will transmit the additional packet while the MS remains in control of its respective CPCH channel.

An optional pre-data power phase can be carried out before the data transmission phase after the MS receives the CD-AICH (note 10 ms power control preamble in UL transmissions shown in FIG. 11).

Any mobile station 15 that transmitted a CD preamble but failed to receive a corresponding acknowledgement CD-AICH will refrain from further transmissions on the CPCH channel.

Unresolved collision occurs when two or more mobile stations requested the same group of channels and selected the same CD signature. Then, these two or more mobile stations will enter the pre-data power control phase or the message phase. Upon detection of such a condition, the BS will force the colliding mobile stations to abort their data transmissions by ceasing the transmission of the corresponding Downlink Dedicated channel DL-DPCCH. Upon detecting the loss of the DL-DPCCH transmission, each MS will abort its uplink transmission.

Another optional operation of this invention is the base station channel resource assignment. The CPCH resources are assigned to each Base Node by the Radio Network Controller (RNC) 11 based on the traffic demand projection. In operation, the RNC receives traffic measurement information from the base stations B and mobile stations 15. In this way, the RNC 11 monitors traffic demand, as represented by actual traffic measurement information of communications through the base stations 13 for the mobile stations 15. Based on the traffic demand or a projection thereof, the RNC 11 assigns channel resources to the base stations 13, by re-configuring the CPCH channel code resources within each cell. Channel groupings are updated accordingly.

There could be multiple CPCH channels and they could operate at various data rates. The flexibility to operate the CPCH at various rates allows the operator to match the incoming packet size distribution to the possible payload size in each CPCH data rate.

To ensure a complete understanding of the invention, it may be helpful to consider the structure of preferred embodiments of the base station transceivers and the mobile station transceivers.

Figure 5:
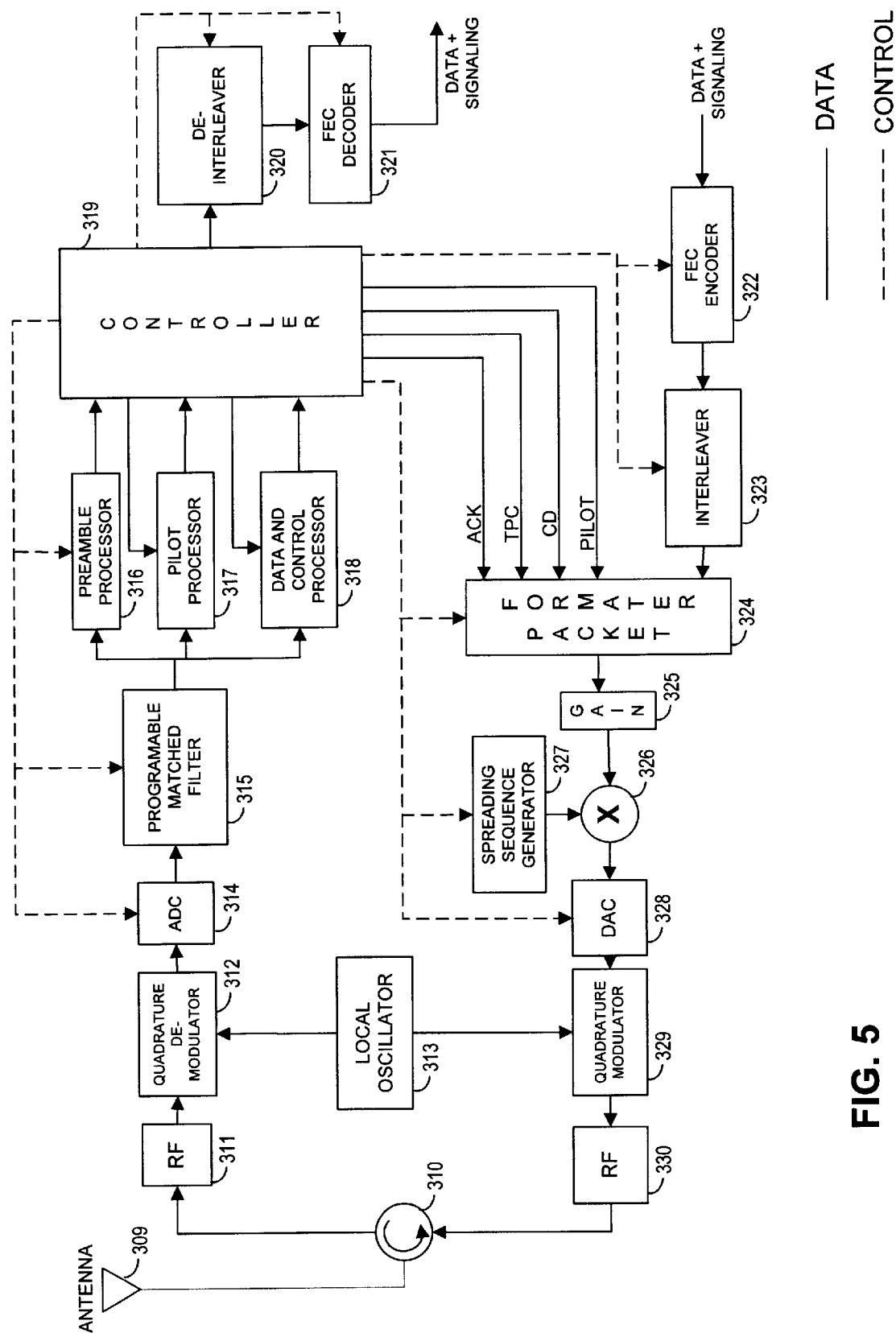
FIG. 5 is a functional block diagram of the transceiver elements (PHY layer) of a spread spectrum base station for use in a network of the type shown in FIG. 4.

FIG. 5 illustrates a presently preferred embodiment of a BS spread-spectrum transmitter and a BS spread-spectrum receiver, essentially in the form of a base-band processor for performing the PHY layer functions. The BS spread-spectrum transmitter and the BS spread-spectrum receiver form one of the transceivers 17 at a base station 13. The BS spread-spectrum receiver includes an antenna 309 coupled to a circulator 310, a receiver radio frequency (RF) section 311, a local oscillator 313, a quadrature demodulator 312, and an analog-to-digital converter 314. The receiver RF section 311 is coupled between the circulator 310 and the quadrature demodulator 312. The quadrature demodulator is coupled to the local oscillator 313 and to the analog to digital converter 314. The output of the analog-to-digital converter 315 is coupled to a programmable-matched filter 315.

A preamble processor 316, pilot processor 317 and data-and-control processor 318 are coupled to the programmable-matched filter 315. A controller 319 is coupled to the preamble processor 316, pilot processor 317 and data-and-control processor 318. A de-interleaver 320 is coupled between the controller 319 and a forward-error-correction (FEC) decoder 321. The decoder 321 outputs data and signaling received via the UL channel to the MAC layer elements (not shown).

The BS spread-spectrum transmitter includes a forward-error-correction (FEC) encoder 322 coupled to an interleaver 323. A packet formatter 324 is coupled to the interleaver 323 and to the controller 319. A variable gain device 325 is coupled between the packet formatter 324 and a product device 326. A spreading-sequence generator 327 is coupled to the product device 326. A digital-to-analog converter 328 is coupled between the product device 328 and quadrature modulator 329. The quadrature modulator 329 is coupled to the local oscillator 313 and a transmitter RF section 330. The transmitter RF section 330 is coupled to the circulator 310.

The controller 319 has control links coupled to the analog-to-digital converter 314, the programmable-matched filter 315, the preamble processor 316, the digital-to-analog converter 328, the spreading sequence generator 327, the variable gain device 325, the packet formatter 324, the de-interleaver 320, the FEC decoder 321, the interleaver 323 and the FEC encoder 322.

A received spread-spectrum signal from antenna 309 passes through circulator 310 and is amplified and filtered by the receiver RF section 311. The local oscillator 313 generates a local signal, which the quadrature demodulator 312 uses to demodulate in-phase and quadrature phase components of the received spread-spectrum signal. The analog-to-digital converter 314 converts the in-phase component and the quadrature-phase component to digital signals. These functions are well known in the art, and variations to this block diagram can accomplish the same functions.

The programmable-matched filter 315 despreads the received spread-spectrum signal components. A correlator, as an alternative, may be used as an equivalent means for despreading the received spread-spectrum signal.

The preamble processor 316 detects the preamble portion of the received spread-spectrum signal. The pilot processor 317 detects and synchronizes to the pilot portion of the received spread-spectrum signal. The data and control processor 318 detects and processes the data portion of the received spread-spectrum signal. Detected data passes through the controller 319 to the de-interleaver 320 and FEC decoder 321. Data and signaling from the UL are outputted from the FEC decoder 321 to the higher layer elements in or associated with the BS 13.

In the BS transceiver, the MAC layer elements (not shown) supply data and signaling information, intended for DL transmission, to the input of the FEC encoder 322. The signaling and data are FEC encoded by FEC encoder 322, and interleaved by interleaver 323. The packet formatter 324 formats data, signaling, acknowledgment signal, collision detection signal, pilot signal and transmitting power control (TPC) signal into appropriate packets. Each packet is outputted from the packet formatter 324, and the packet level is amplified or attenuated by variable gain device 325. The packet is spread-spectrum processed by product device 326, with a spreading chip-sequence from spreading-sequence generator 327. The packet is converted to an analog signal by digital-to-analog converter 328, and in-phase and quadrature-phase components are generated by quadrature modulator 329 using a signal from local oscillator 313. The modulated DL packet is translated to a carrier frequency, filtered and amplified by the transmitter RF section 330, and then it passes through the circulator 310 and is radiated by antenna 309.

Figure 6:
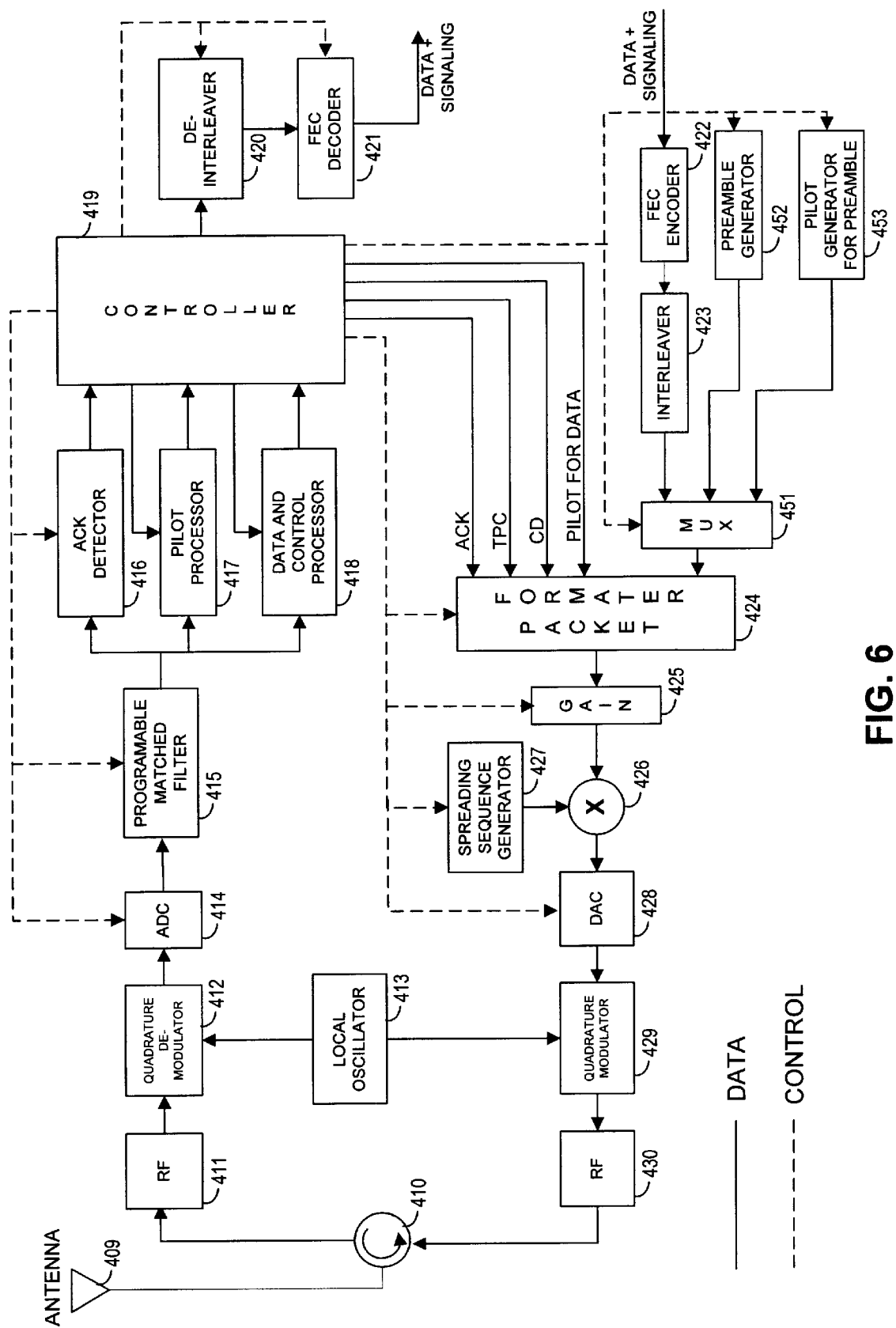
FIG. 6 is a functional block diagram of the transceiver elements (PHY layer) of a spread spectrum remote or mobile station for use in a network of the type shown in FIG. 4.

FIG. 6 shows an embodiment of an MS spread-spectrum transmitter and an MS spread-spectrum receiver, essentially in the form of a base-band processor for performing the PHY layer transceiver functions. The MS spread-spectrum transmitter and the MS spread-spectrum receiver are located at the remote or mobile station (MS) 15, shown in FIG. 4. The MS spread-spectrum receiver includes an antenna 409 coupled to a circulator 410, a receiver radio frequency (RF) section 411, a local oscillator 413, a quadrature demodulator 412, and an analog-to-digital converter 414. The receiver RF section 411 is coupled between the circulator 410 and the quadrature demodulator 412. The quadrature demodulator is coupled to the local oscillator 413 and to the analog to digital converter 414. The output of the analog-to-digital converter 415 is coupled to a programmable-matched filter 415.

An acknowledgment detector 416, pilot processor 417 and data-and-control processor 418 are coupled to the programmable-matched filter 415. A controller 419 is coupled to the acknowledgment detector 416, pilot processor 417 and data-and-control processor 418. A de-interleaver 420 is coupled between the controller 419 and a forward-error-correction (FEC) decoder 421. The decoder 421 outputs data and signaling received via the DL channel to the MAC layer elements (not shown) of the MS.

The MS spread-spectrum transmitter includes a forward-error-correction (FEC) encoder 422 coupled to an interleaver 423. A packet formatter 424 is coupled through a multiplexer 451 to the interleaver 423. The packet formatter 424 also is coupled to the controller 419. A preamble generator 452 and a pilot generator 453 for the preamble are coupled to the multiplexer 451. A variable gain device 425 is coupled between the packet formatter 424 and a product device 426. A spreading-sequence generator 427 is coupled to the product device 426. A digital-to-analog converter 428 is coupled between the product device 428 and quadrature modulator 429. The quadrature modulator 429 is coupled to the local oscillator 413 and a transmitter RF section 430. The transmitter RF section 430 is coupled to the circulator 410.

The controller 419 has control links coupled to the analog-to-digital converter 414, the programmable-matched filter 415, the acknowledgment detector 416, the digital-to-analog converter 428, the spreading sequence generator 427, the variable gain device 425, the packet formatter 424, the de-interleaver 420, the FEC decoder 421, the interleaver 423, the FEC encoder 422, the preamble generator 452 and the pilot generator 453.

A received spread-spectrum signal from antenna 409 passes through circulator 410 and is amplified and filtered by the receiver RF section 411. The local oscillator 413 generates a local signal, which the quadrature demodulator 412 uses to demodulate in-phase and quadrature phase components of the received spread-spectrum signal. The analog-to-digital converter 414 converts the in-phase component and the quadrature-phase component to digital signals. These functions are well known in the art, and variations to this block diagram can accomplish the same functions.

The programmable-matched filter 415 despreads the received spread-spectrum signal components. A correlator, as an alternative, may be used as an equivalent means for despreading the received spread-spectrum signal.

The acknowledgment detector 416 detects the acknowledgment in the received spread-spectrum signal. The pilot processor 417 detects and synchronizes to the pilot portion of the received spread-spectrum signal. The data and control processor 418 detects and processes the data portion of the received spread-spectrum signal. Detected data passes through the controller 419 to the de-interleaver 420 and FEC decoder 421. Data and signaling from the DL are outputted from the FEC decoder 421 to the higher level elements in or associated with the MS 15.

In the MS transceiver, the MAC layer elements (not shown) supply data and signaling information intended for transmission over the UL channel, to the input of the FEC encoder 422. Data and signaling information are FEC encoded by FEC encoder 422, and interleaved by interleaver 423. The preamble generator 452 generates a preamble, and the pilot generator 453 generates a pilot for the preamble. The multiplexer 451 multiplexes the data, preamble and pilot, and the packet formatter 424 formats the preamble, pilot and data into a common-packet channel packet. Further, the packet formatter 424 formats data, signaling, acknowledgment signal, collision detection signal, pilot signal and TPC signal into a packet. The packet formatter 424 outputs the packet, and the packet level is amplified or attenuated by variable gain device 425. The packet is spread-spectrum processed by product device 426, with s spreading chip-sequence from spreading-sequence generator 427. The packet is converted to an analog signal by digital-to-analog converter 428, and quadrature modulator 429 using a signal from local oscillator 413 generates in-phase and quadrature-phase components. The modulated UL packet is translated to a carrier frequency, filtered and amplified by the transmitter RF section 430 and then it passes through the circulator 430 and is radiated by the antenna 409.

Figure 10:
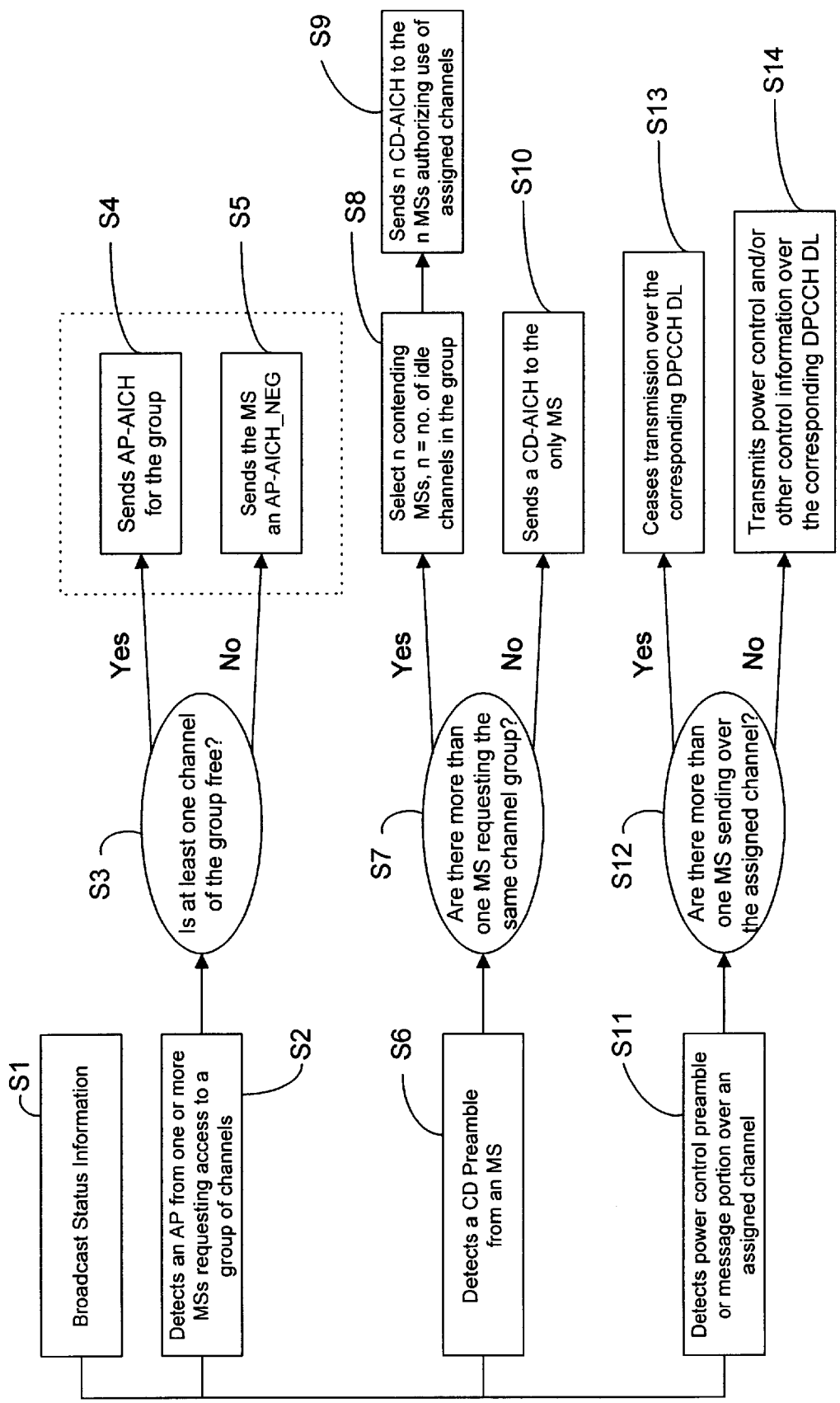
FIG. 10 is a process flow diagram illustrating an example of the base station (BS) Access Procedure.

FIG. 10 is a flow-chart illustrating a physical layer procedure for a BS access procedure. The procedure operates as outlined below.

First, the BS periodically or non-periodically broadcasts the availability of each CPCH channel, or preferably each channel-group, over a Status Broadcast Channel (S1). The availability information can be in the form of idle-ness or busy-ness or logical availability and may contain data rate availability information. Each mobile station seeking access selects an access preamble (AP) corresponding to a selected group of two or more of the CPCH channels, using the availability information. The mobile station sends the selected preamble to the base station.

Upon detecting an access preamble (AP) from one or more mobile stations (MSs) requesting a CPCH channel (at S2), the base station (BS) determines if one of the channels of the group corresponding to the received preamble is actually available at the time (S3). If so, then the base station sends an acquisition indicator for a channel (AICH) to the mobile stations (S4). Here, the transmitted AICH signal is one corresponding to the particular group of 20 channels rather than an individual channel. The BS sends the AP-AICH signal in a downlink access slot corresponding to the detected uplink access slot. Hence, at branch step S3, if a channel in the requested group is available, the acquisition indicator is AP-AICH, indicating a positive response (S4). If none of the requested channels are available, the acquisition indicator is AP-AICH_NEG, indicating a negative response (S5).

In accord with the invention, the access preamble (AP) corresponds to two or more CPCH channels in a group, and the base station sends back an AP-AICH corresponding to the preamble (S4). The mobile station or stations seeking access can not yet know yet which channel in the group to use. Any mobile station that has sent an access preamble (AP) for the desired channel group that detects receipt of the corresponding AP-AICH from the base station will next initiate a collision detection (CD) phase of operation. Each such mobile station initiates the CD phase by randomly selecting one CD signature from a number of possible CD signatures. Each mobile station will transmit one such randomly selected CD signature as a preamble code.

At the base station, the station receives at least one CD preamble from a mobile station (S6). Upon detecting a CD Preamble from a mobile station (S6), the base station determines if there are two or more mobile stations requesting the available channel group (S7). If multiple mobile stations are requesting channel access, the base station selects one of those mobile stations for each available channel (S8) and assigns the respective available channel to the selected mobile station. Stated another way, in step S8, if there are n channels available in the group, the base station selects n of the requesting mobile stations and assigns one of the available channels to each of those mobile stations.

Each CD preamble maps to a unique subset of possible acknowledgments. Each subset of possible acknowledgments corresponds in number to the number of channels in the particular CPCH channel-group. To select a mobile station, the base station selects the subset corresponding to the CD preamble from that mobile station, and to identify the particular assigned one of the channels, the base station selects and sends back the CD acknowledgement corresponding to the one assigned channel. Hence, in step S9, the base station sends n CD acknowledgments (CD-AICH), each of which is a base station collision detection preamble that corresponds to the CD signature of the selected mobile station's CD Preamble and identifies one of the channels assigned to the particular mobile station.

At the decision point S7, if there is only one mobile station requesting the available channel, the base station assigns a channel from the group to the one mobile station by transmitting a CD-AICH. Here, the CD-AICH corresponds to the CD signature of that mobile station's CD Preamble and corresponds to the one channel of the group (S10).

Upon receiving a power control preamble or packet data from a mobile station over an assigned channel (S11), the base station determines if there is one transmitting mobile station or multiple transmitting mobile stations (S12). If the determination at step S12 indicates that there are multiple mobile stations transmitting over the assigned channel, then the base station ceases transmission on the corresponding DPCCH DL (S13), to instruct those mobile stations to abort transmissions over the assigned CPCH channel. However, if only one mobile station is detected at step S12, then the base station transmits power control information on the DPCCH DL corresponding to the assigned channel (S14), and packet communication continues to completion between the base station and the mobile station on the assigned channel.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. In a code-division-multiple-access (CDMA) system employing spread-spectrum modulation comprising a radio network controller, a plurality of base stations, each base station (BS) comprising a BS-spread-spectrum transmitter and a BS-spread-spectrum receiver, and a plurality of mobile stations, each mobile station (MS) comprising an MS-spread-spectrum transmitter and an MS-spread-spectrum receiver, a method comprising the steps of:

transmitting from an MS-spread-spectrum transmitter of a first mobile station at least one access preamble comprising an access preamble signature corresponding to a group of common packet channel (CPCH) channels selected from a plurality of groups of CPCH channels;

transmitting from an MS-spread-spectrum transmitter of a second mobile station at least one access preamble comprising said access preamble signature;

receiving at the BS spread-spectrum receiver of one of the base stations at least one of the access preambles at a detectable-power level;

responsive to receipt of the at least one access preamble at the detectable power level, transmitting an acknowledgment signal corresponding to the access preamble signature from the BS-spread-spectrum transmitter of the one base station;

receiving the acknowledgment signal at the MS-spread-spectrum receiver of each of the first and second mobile stations;

transmitting from the MS-spread-spectrum transmitter of the first mobile station a first collision detection preamble comprising a first collision detection signature;

transmitting from the MS-spread-spectrum transmitter of the second mobile station a second collision detection preamble comprising a second collision detection signature;

substantially concurrently receiving the first and second collision detection preambles at the BS spread-spectrum receiver of the one base station;

identifying a first available CPCH channel among the selected group of CPCH channels;

selecting the first mobile station for assignment of the identified CPCH channel;

transmitting from the BS-spread-spectrum transmitter of the one base station a base station collision detection preamble, the base station collision detection preamble corresponding to the first collision detection preamble signature and to the identified CPCH channel;

receiving the base station collision detection preamble at the MS-spread-spectrum receiver of the first mobile station; and transmitting from the MS-spread-spectrum transmitter. of the first mobile station a spread-spectrum signal comprising any of data and power control information, over the identified CPCH channel, responsive to the receipt of the base station collision detection preamble.

2. A method as set forth in claim 1, further comprising transmitting any of data and power control information, to the MS-spread-spectrum receiver of the first mobile station, from the BS-spread-spectrum transmitter of the one base station.

3. A method as set forth in claim 1, further comprising the steps of:

transmitting from the BS-spread-spectrum transmitter of one base station a broadcast common-status channel, the broadcast common-status channel comprising data regarding availability or available data rates for the groups of CPCH channels; and receiving the broadcast common-status channel at the MS-spread-spectrum receivers of the first and second mobile stations, wherein each mobile station chooses the selected group of CPCH channels based on the data regarding broadcast availability or available data rates.

4. A method as set forth in claim 1, further comprising:

measuring traffic of the plurality of base stations and the plurality of mobile stations, at the radio network controller, to monitor traffic demand; and assigning channel resources among the plurality of base stations by re-configuring the channel resources within each cell of each base station responsive to the monitored traffic demand.

5. A method as set forth in claim 1, wherein the step of transmitting the spread-spectrum signal comprising any of data and power control information, over the identified channel, comprises piggybacking at least one data packet that becomes ready-to-send immediately after transmission of a first data packet.

6. A method as in claim 1, further comprising conducting a power control phase between the one base station and the first mobile station after transmitting the base station collision detection preamble and before receiving data over the one common packet channel.

7. A method as set forth in claim 1, further comprising:

selecting the second mobile station for assignment of a second available CPCH channel of the selected group of CPCH channels;

transmitting from the BS-spread-spectrum transmitter of the one base station a second base station collision detection preamble, the second base station collision detection preamble corresponding to the second collision detection signature and to the second available CPCH channel; and receiving the second base station collision detection preamble at the MS-spread-spectrum receiver of the second mobile station; and transmitting from the MS-spread-spectrum transmitter of the second mobile station a spread-spectrum signal comprising any of data and power control information, over the second available CPCH channel, responsive to the receipt of the second base station collision detection preamble.

8. A method as set forth in claim 7, further comprising transmitting any of data and power control information, to the MS-spread-spectrum receiver of the second mobile station, from the BS-spread-spectrum transmitter of the one base station.

9. A method as set forth in claim 7, further comprising the steps of:

transmitting from the BS-spread-spectrum transmitter of one base station a broadcast common-status channel, the broadcast common-status channel comprising data regarding the availability or available data rates for the groups of CPCH channels; and receiving the broadcast common-status channel at the MS-spread-spectrum receivers of the first and second mobile stations, wherein each mobile station chooses the selected group of CPCH channels based on the data regarding broadcast availability or available data rates.

10. A method as set forth in claim 7, wherein:

at least one of the transmissions from the BS-spread-spectrum transmitter of the one base station utilizes a downlink channel corresponding to one of the first and second available CPCH channels; and the MS-spread-spectrum receiver of any of the first and second mobile stations halts any further transmission over the first or the second available CPCH channel in response to any detection of a loss of the downlink channel.

11. A method as set forth in claim 7, wherein the step of transmitting the spread-spectrum signal comprising any of data and power control information, over the second available CPCH channel, comprises piggybacking at least one packet that becomes ready-to-send immediately after transmission of a first data packet.

12. A method as in claim 7, further comprising conducting a power control phase between the one base station and each of the first and second mobile stations following the transmitting of the base station collision detection preamble and the second base station collision detection preamble, respectively.

13. A code-division-multiple-access (CDMA) wireless base station, comprising:
   a CDMA transmitter;
   a CDMA receiver; and
   a controller coupled to the CDMA receiver for responding to signals received via the CDMA receiver and coupled for controlling the CDMA transmitter, such that in operation the CDMA base station is for performing the following steps:
      receiving at least a portion of an access burst from a remote station, the access burst comprising a sequence of coded preamble signals at sequentially increasing discrete power levels, each coded preamble signal in the sequence comprising one of a plurality of possible signature codes, the one signature code corresponding to one of a corresponding plurality of groups of common packet channels operated through the base station;
      detecting a first one of the coded preamble signals of the sequence that is received at an adequate power level;
      upon detection of the first coded preamble signal at the adequate power level, transmitting an access acknowledgement signal corresponding to the one signature code;
      receiving one of a plurality of collision detection preamble signals from the remote station;
      selecting an available one of the common packet channels of the one group;
      transmitting a collision detection acknowledgement signal corresponding to the received collision detection preamble signal and identifying the selected common packet channel; and
      receiving any of data and power control information over the selected common packet channel from the remote station.

14. A CDMA wireless base station as in claim 13, wherein the controller is further responsive to the CDMA receiver and controls the CDMA transmitter, such that in operation the CDMA base station performs the additional steps of:
   receiving another one of the collision detection preamble signals from another remote station, following the transmission of the access acknowledgement signal;
   selecting another available one of the common packet channels of the one group;
   transmitting another collision detection acknowledgement signal, corresponding to the other received collision detection preamble signal and the other selected common packet channel; and
   receiving any of data and power control information over the other selected common packet channel from the other remote station.

15. A CDMA wireless base station as in claim 13, wherein the controller is further responsive to the CDMA receiver and controls the CDMA transmitter, such that in operation the CDMA base station performs the additional step of transmitting a broadcast common-status channel, the broadcast common-status channel comprising availability-related status information regarding the groups of common packet channels.

16. A CDMA wireless base station as in claim 13, wherein the controller is further responsive to the CDMA receiver and controls the CDMA transmitter, such that in operation the CDMA base station performs the additional step of transmitting any of data and power control information to the remote station.

17. A CDMA wireless base station as in claim 13, wherein the controller is further responsive to the CDMA receiver and controls the CDMA transmitter such that in operation the CDMA base station performs a power control phase after transmitting the collision detection acknowledgement signal and before receiving any data over the selected common packet channel.

18. A base-band processor, for use in a code-division-multiple-access (CDMA) wireless base station having a modulator and a demodulator, the base-band processor comprising:
   a preamble processor, coupled to the demodulator, for detecting a preamble in a received spread-spectrum signal;
   a data processor, coupled to the demodulator, for detecting and processing any data contained in the received spread-spectrum signal;
   an encoder, for encoding data;
   an interleaver, coupled to the encoder, for interleaving encoded data;
   a packet formatter, coupled to the interleaver, for formatting the interleaved data into a packet; and
   a controller coupled to the preamble processor and coupled for controlling the modulator, the data processor and the packet formatter, such that in operation the base-band processor is for performing the following steps:
      receiving at least a portion of an access burst from a remote station, the access burst comprising a sequence of coded preamble signals at sequentially increasing discrete power levels, each coded preamble signal in the sequence comprising one of a corresponding plurality of possible signature codes, the one signature code corresponding to one of a plurality of groups of the common packet channels operated through the base station;
      detecting a first one of the coded preamble signals of the sequence that is received at an adequate power level;
      upon detection of the first coded preamble signal at the adequate power level, transmitting an access acknowledgement signal corresponding to the one signature code
      receiving one of a plurality of collision detection preamble signals from the remote station;
      selecting an available one of the common packet channels of the one group;
      transmitting a collision detection acknowledgement signal corresponding to the received collision detection preamble signal and identifying the selected common packet channel; and
      receiving any of data and power control information over the selected common packet channel from the remote station.

19. A base-band processor as in claim 18, wherein the controller is further arranged such that in operation the base-band processor is for:
   receiving a second one of the collision detection preamble signals from another remote station, following the transmission of the access acknowledgement signal;
   selecting another available one of the common packet channels of the one group;

transmitting a collision detection acknowledgement signal corresponding to the other received collision detection preamble signal and identifying the other selected common packet channel; and
receiving any of data and power control information over the other selected common packet channel from the other remote station.

20. A base-band processor as in claim 18, wherein the controller is further arranged such that in operation the base-band processor is for transmitting a broadcast common-status channel comprising availability-related status information for groups of common packet channels.

21. A base-band processor as in claim 18, wherein the controller is further arranged such that in operation the base-band processor is for transmitting any of data and power control information to the remote station.

22. A base-band processor as in claim 18, wherein the controller is further arranged such that in operation the base-band processor is for performing a power control phase after transmitting the base station collision detection preamble and before receiving any data over the one common packet channel.

23. A code-division-multiple-access (CDMA) wireless remote station, comprising:
a CDMA transmitter;
a CDMA receiver; and
a controller coupled to the CDMA receiver for responding to signals received via the CDMA receiver and coupled for controlling the CDMA transmitter, such that in operation the CDMA remote station is for performing the following steps:
selecting one of a plurality of groups of common packet channels from groups of common packet channels served through a base station;
transmitting an access burst comprising a sequence of coded preamble signals at sequentially increasing discrete power levels, each coded preamble signal in the sequence comprising one of a plurality of possible signature codes, the one signature code corresponding to the selected group of common packet channels;
receiving an acknowledgement signal corresponding to the one signature code from the base station;
selecting one of a plurality of possible collision detection codes;
transmitting the selected collision detection code;
receiving a collision detection acknowledgement signal from the base station, the collision detection acknowledgement signal corresponding to the selected collision detection code and identifying one common packet channel from within the selected group; and
transmitting any of data and control information over the one common packet channel following receipt of the collision detection acknowledgement signal.

24. A CDMA wireless remote station as in claim 23, wherein the controller is further responsive to the CDMA receiver and controls the CDMA transmitter, such that in operation the CDMA remote station receives any of data and control information from the base station over a downlink channel corresponding to the one common packet channel.

25. A CDMA wireless remote station as in claim 23, wherein:
the controller is further responsive to the CDMA receiver and controls the CDMA transmitter, such that in operation the CDMA remote station receives a broadcast common-status channel from the base station,
the broadcast common-status channel comprises availability-related status information for one or more channels of each group of common packet channels served through the base station, and
choice of the selected group is based on the status information.

26. A base-band processor, for use in a code-division-multiple-access (CDMA) wireless remote station having a spread-spectrum modulator and a spread-spectrum demodulator, the base-band processor, comprising:
an acknowledgment detector, coupled to the demodulator, for detecting an acknowledgment in a received spread-spectrum signal;
an encoder, for encoding data;
an interleaver, coupled to the encoder, for interleaving encoded data;
a preamble generator for generating a preamble;
a multiplexer, coupled to the interleaver and to the preamble generator, for multiplexing the interleaved data and the preamble;
a packet formatter, coupled to the multiplexer, for formatting the multiplexed data and preamble into one or more packets; and
a controller coupled to the acknowledgment detector and coupled for controlling the modulator, the preamble generator, the multiplexer and the packet formatter, such that in operation the base-band processor is for performing the following steps:
selecting one of a plurality of groups of common packet channels from groups of common packet channels served through a base station;
transmitting an access burst comprising a sequence of coded preamble signals at sequentially increasing discrete power levels, each coded preamble signal in the sequence comprising one of a plurality of possible signature codes, the one signature code corresponding to the selected group of common packet channels;
receiving an acknowledgement signal corresponding to the one signature code from the base station;
selecting one of a plurality of possible collision detection codes;
transmitting the selected collision detection code;
receiving a collision detection acknowledgement signal from the base station, the collision detection acknowledgement signal corresponding to the selected collision detection code and identifying one common packet channel from within the selected group; and
transmitting data over the one common packet channel following receipt of the collision detection acknowledgement signal.

27. A base-band processor as in claim 26, wherein the controller is further arranged such that in operation the base-band processor is for receiving any of data and control information from the base station over a downlink channel corresponding to the one common packet channel.

28. A base-band processor as in claim 26, wherein
the controller is further arranged such that in operation the base-band processor is for receiving a broadcast common-status channel from the base station,
the broadcast common-status channel comprises availability-related status information for one or more channels of each group of common packet channels served through the base station, and
choice of the selected group is based on the status information.

* * * * *